United States Patent
Hummel

(10) Patent No.: US 7,856,733 B2
(45) Date of Patent: Dec. 28, 2010

(54) SAW GAUGE

(75) Inventor: Richard M. Hummel, Parma, OH (US)

(73) Assignee: Woodpeckers, Inc., North Royalton, OH (US)

( * ) Notice: Subject to any disclaimer, the term of this patent is extended or adjusted under 35 U.S.C. 154(b) by 0 days.

(21) Appl. No.: 12/367,808

(22) Filed: Feb. 9, 2009

(65) Prior Publication Data

US 2010/0199508 A1 Aug. 12, 2010

(51) Int. Cl.
*B23Q 17/22* (2006.01)
(52) U.S. Cl. .......................................... 33/640; 33/641
(58) Field of Classification Search .................. 33/640, 33/533, 633, 628, 626; 29/401.1, 407.01, 29/407.05; 83/477.2
See application file for complete search history.

(56) References Cited

U.S. PATENT DOCUMENTS

| | | | |
|---|---|---|---|
| 2,710,633 A | 6/1955 | Oberg | |
| 4,165,668 A | 8/1979 | McCord, Jr. | |
| 5,097,601 A * | 3/1992 | Pollak et al. | 33/471 |
| 5,121,553 A | 6/1992 | Boerder | |
| 5,207,007 A * | 5/1993 | Cucinotta et al. | 33/640 |
| 5,735,054 A | 4/1998 | Cole | |
| 5,979,283 A * | 11/1999 | Osborne | 83/477.2 |
| 6,195,905 B1 * | 3/2001 | Cole | 33/640 |
| 6,237,457 B1 * | 5/2001 | Taylor | 83/477.2 |
| 6,584,698 B1 * | 7/2003 | Liu | 33/640 |
| 6,848,350 B2 * | 2/2005 | Brazell et al. | 83/435.11 |

\* cited by examiner

*Primary Examiner*—Yaritza Guadalupe-McCall
(74) *Attorney, Agent, or Firm*—Sand & Sebolt

(57) ABSTRACT

A gauge for aligning a saw comprising a body having a bottom surface, a centering device adapted to fit within a miter gauge slot having various sizes, a cradle located on the centering device, and wherein the body bottom surface rests on the cradle during operation. A method of aligning a saw blade or a table fence comprising the steps of locating a centering device within a miter gauge slot, locating a cradle on the centering device, locating a body having a measurement portion and a counterweight on the cradle, adjusting the measurement portion to achieve a reference point, moving the centering device, the cradle, and the body along the miter gauge slot length to a second position, and obtaining a distance from the measurement portion as the body is moved along the miter gauge slot length.

20 Claims, 12 Drawing Sheets

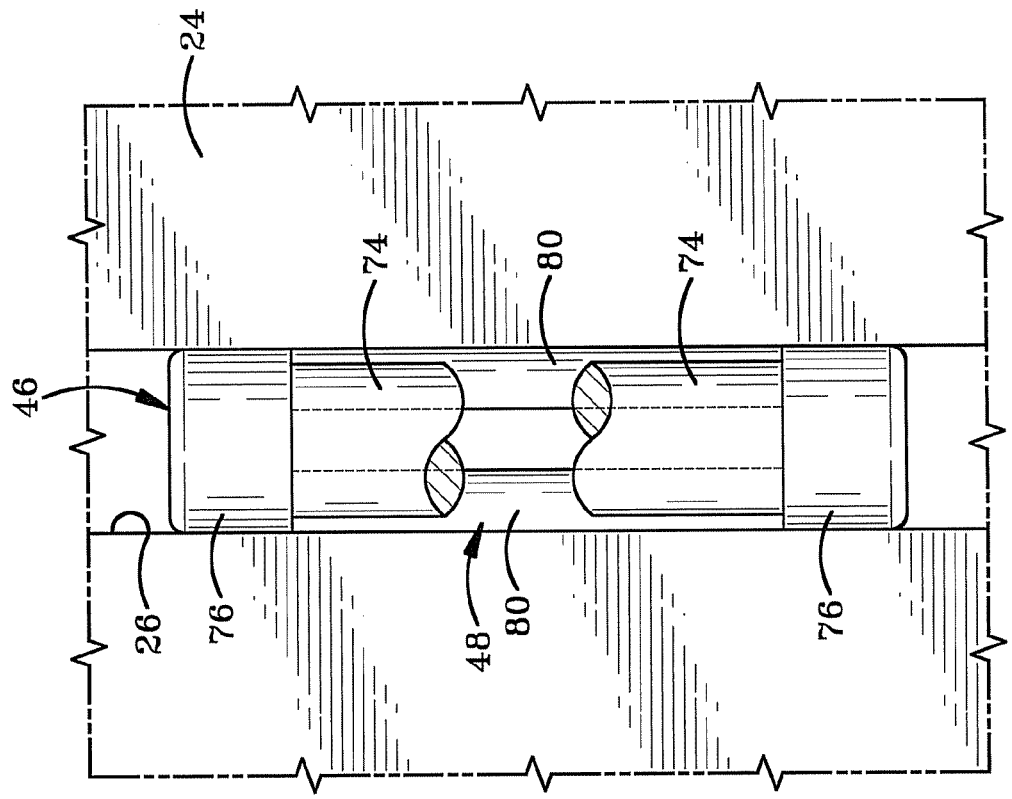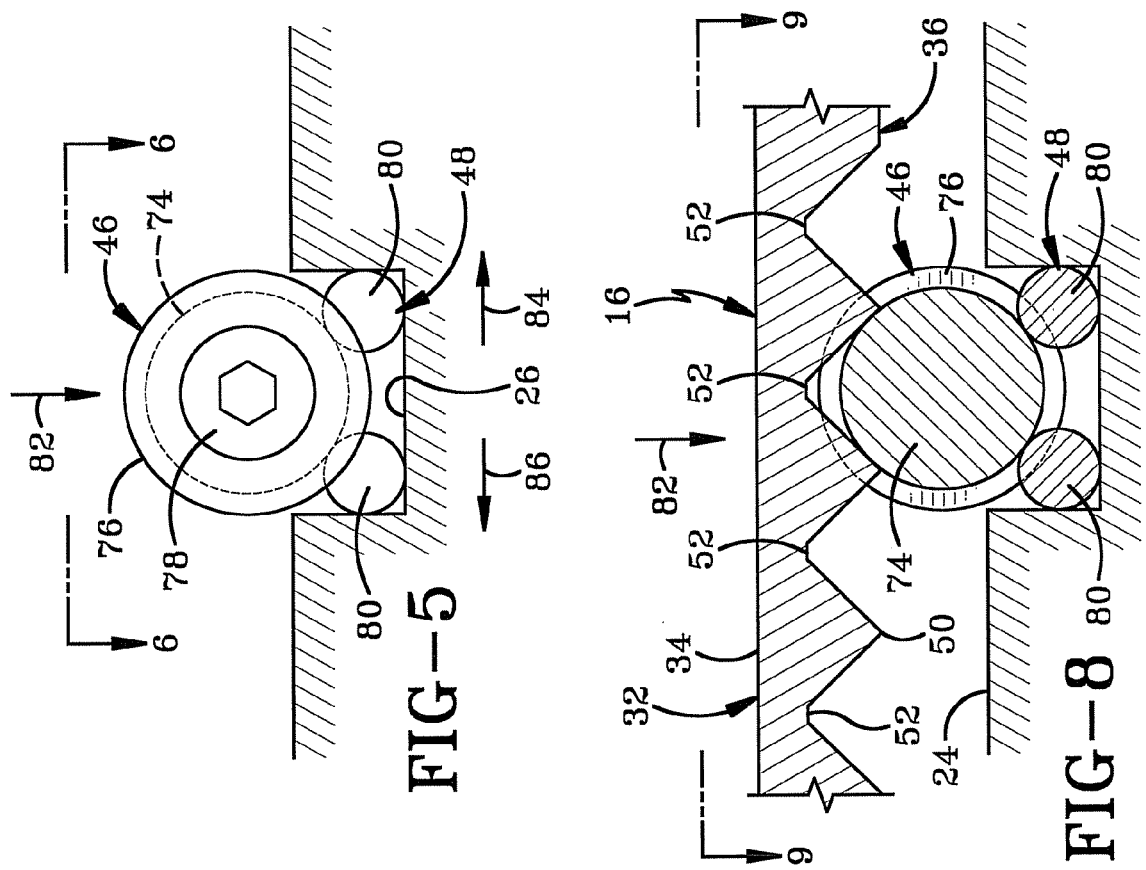

SAW GAUGE

BACKGROUND OF THE INVENTION

1. Technical Field

The invention relates generally to alignment tools for cutting devices. More particularly, the invention relates to a consistent and precise device for aligning two objects so that they are parallel throughout their lengths. Specifically, the invention relates to a gauge for easily and efficiently aligning a table saw blade and table saw fence.

2. Background Information

A table saw is an efficient and simple way to precisely cut wood. The table saw provides flexibility in the size of the piece to be cut, as well as the angle the wood is cut on. To adjust the size of the finished product, a traditional table saw uses adjustable fences to vary the distance between the fence and the saw blade. While the fence remedies the problem of easily adjusting the length, it is sometimes difficult to perfectly align the fence parallel to the miter gauge slot. If the fence is not perfectly parallel, then the cut may not be straight as the user directs the wood along the fence.

Another potential issue is the alignment of the table saw blade. In particular, the table saw blade is adjustable for a variety of angled cuts. However, to produce an angle-free cut, the blade must be perfectly aligned. Since the blade is adjustable to virtually infinite positions, it can be extremely difficult to align the saw blade.

Traditionally, the process to perfectly align the table saw blade or the fence gate with the miter slot gauge was cumbersome, time-consuming, and required the use of several tools. A dial gauge with an extendable arm and magnetic base was generally used. First, the user would locate and turn on the magnet in a position to take measurements. Then, in order to make an adjustment, the magnet would have to be turned off and moved out of the way. After the adjustment, the user would once again take the same measurement and repeat the process as necessary.

Still another shortcoming was the difficulty in providing an accurate parallelism measurement between the length of the fence and the miter gauge slot. Particularly, the ability to measure small changes in the distance between the miter gauge slot and the fence requires that the measuring device maintain a consistent horizontal reference point. The inability to maintain the consistent horizontal reference point made the use of a dial gauge with an extendable arm and magnetic base impracticable.

Thus there is a long-felt need for a simple, effective, and tool-free device that can measure both run out of the table saw fence and the angle of the table saw blade.

SUMMARY OF THE INVENTION

The present invention broadly comprises a gauge for aligning a saw comprising a body having a bottom surface, a centering device adapted to fit within a miter gauge slot having various sizes, a cradle located on the centering device, and wherein the body bottom surface rests on the cradle during operation.

The present invention also broadly comprises a method of aligning a saw blade or a table fence comprising the steps of locating a centering device within a miter gauge slot, locating a cradle on the centering device, locating a body having a measurement portion and a counterweight on the cradle, adjusting the measurement portion to achieve a reference point, moving the centering device, the cradle, and the body along the miter gauge slot length to a second position, and obtaining a distance from the measurement portion as the body is moved along the miter gauge slot length.

BRIEF DESCRIPTION OF THE DRAWINGS

The preferred embodiments of the invention, illustrative of the best modes in which Applicant has contemplated applying the principles of the invention, are set forth in the following description and are shown in the drawings.

FIG. 5 is a right plan view of a preferred embodiment alignment pins and cradle being located within a miter gauge slot;

FIG. 6 is a top plan view of a preferred embodiment cradle located on alignment pins within a miter gauge slot;

FIG. 8 is a right plan view of a preferred embodiment saw gauge located on alignment pins and a cradle with portions shown in section;

DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The saw gauge of the present invention is indicated generally at 16, as is particularly shown in FIGS. 1 through 14 located on a table saw 18, shown with a saw blade 20 and a table fence 22.

Figure 1:
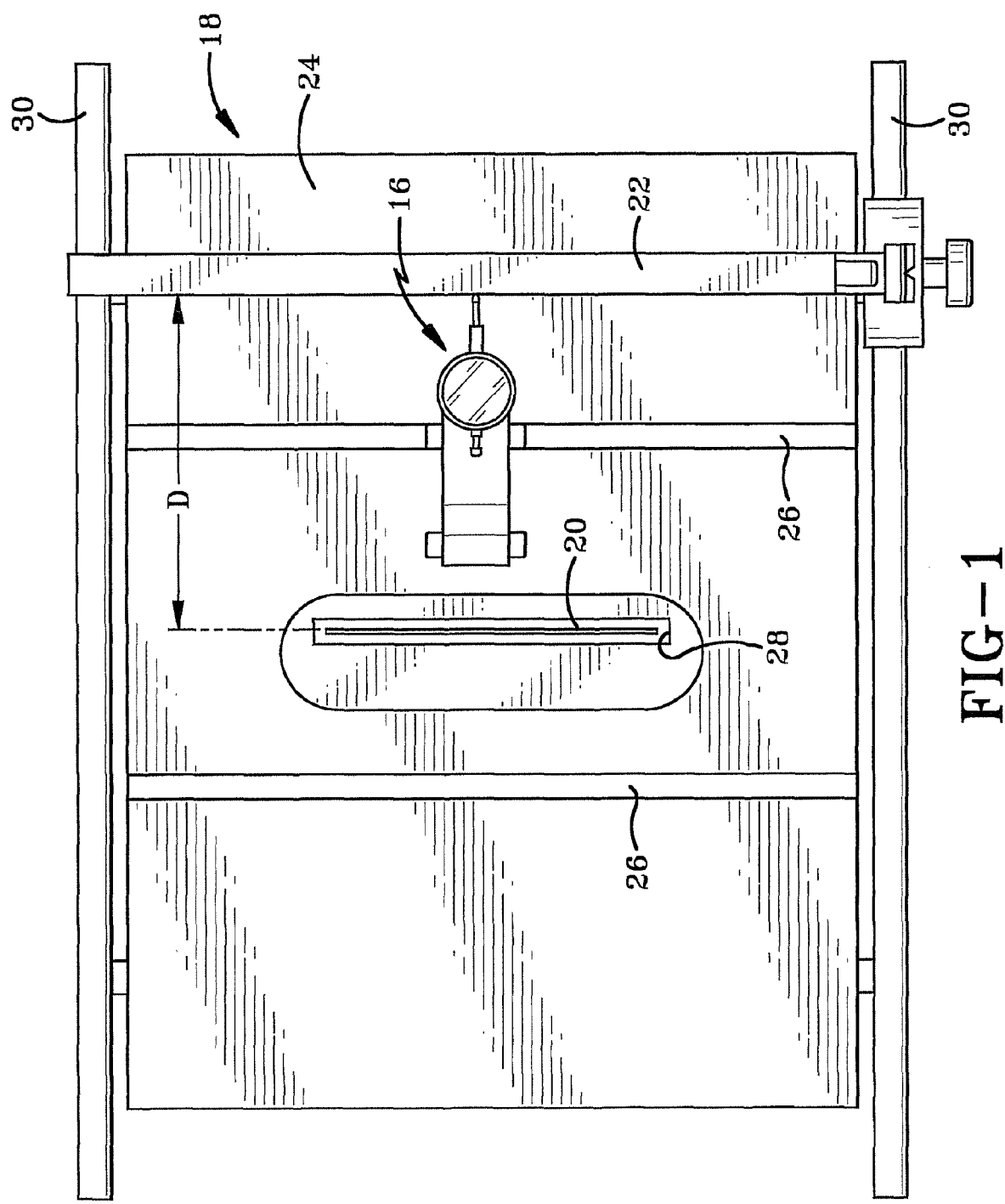
FIG. 1 is a top plan view of a preferred embodiment saw gauge measuring the alignment of a table fence.

As seen in FIG. 1, table saw 18 includes a work surface 24 defining a pair of miter gauge slots 26 and an opening 28. Both miter gauge slots 26 and opening 28 are preferably arranged across the width of the table so that miter gauge slots 26, opening 28, and table saw blade 20 are each parallel to one another. Table fence 22 is movable along mounting rods 30 so that a distance D between table fence 22 and table saw blade 20 may be easily adjusted.

Miter gauge slots 26 are preferably traditional and typical slots which are precision machined into the work surface by the manufacturer and provide a consistent alignment location. Further, opening 28 is also precision machined by the manufacturer with enough clearance to allow saw blade 20 be to adjusted in order to provide cuts on various angles, as well as make fine adjustments to the saw blade alignment.

Figure 2:
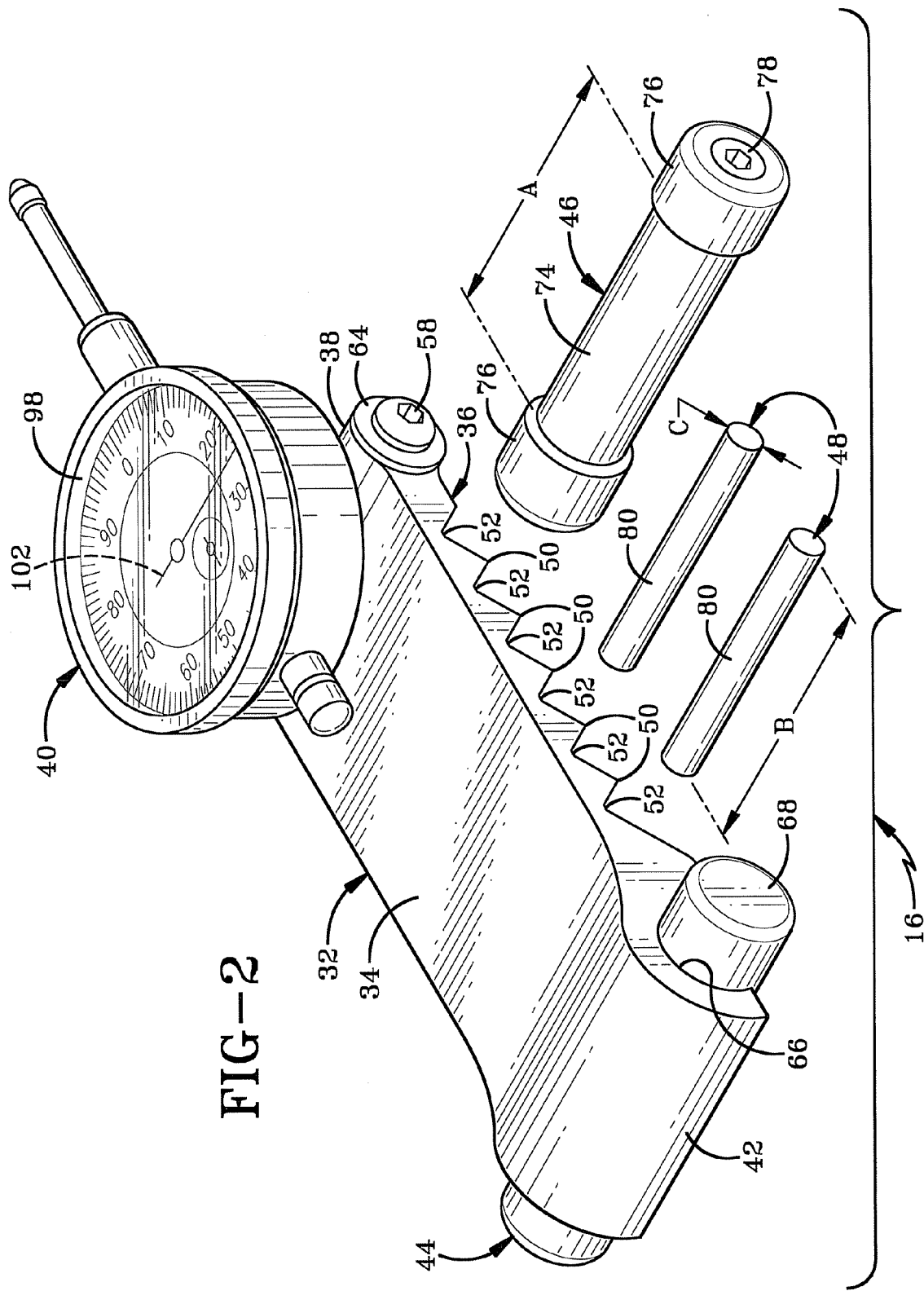
FIG. 2 is a perspective view of a preferred embodiment saw gauge with the components separated.
Figure 3:
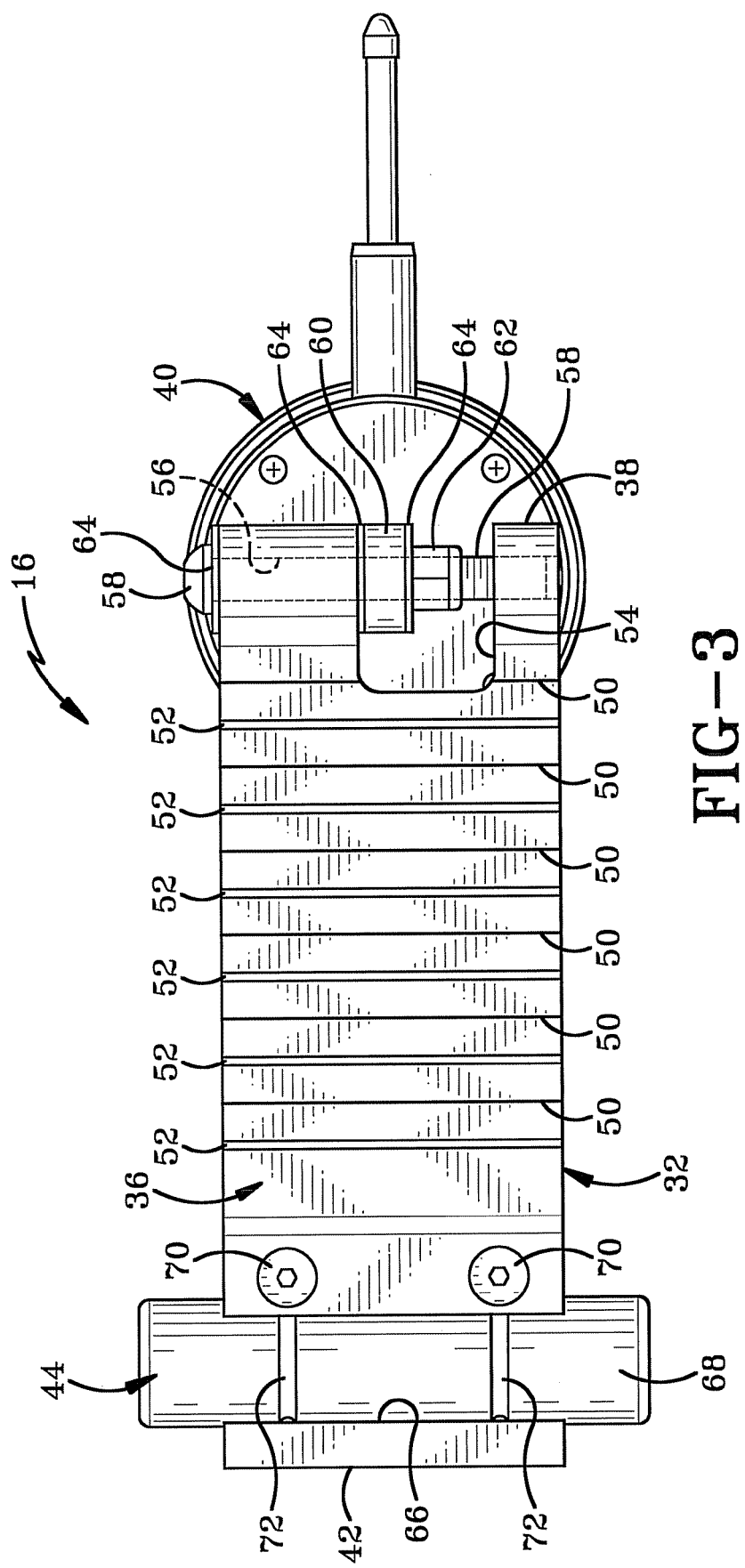
FIG. 3 is a bottom plan view of a preferred embodiment saw gauge.

FIG. 2 illustrates a perspective view of saw gauge 16, while FIG. 3 illustrates a bottom view of the saw gauge. In accordance with one of the main features of the invention, saw gauge 16 includes body 32 having a top surface 34 and a bottom surface 36. A proximate end 38 of the body terminates in a dial indicator 40, while a distal end 42 of the body includes a leveling portion 44. Saw gauge 16 further includes a cradle 46 and a centering device 48. In a preferred embodiment, two centering devices are utilized, however one of ordinary skill in the art will immediately recognize that any suitable centering device may be used and is within the spirit and scope of the invention as claimed.

Bottom surface 36 also includes a plurality of peaks 50 staggered with a plurality of valleys 52. Peaks 50 and valleys 52 operate to provide a coarse adjustment depending upon the distance between the miter gauge slot and the object being measured. Further, the peaks and valleys are sized and shaped in a generally triangular shape to allow cradle 46 to rest between any two peaks 50 as described in greater detail below.

Proximate end 38 of body 32 includes a recessed portion 54 and defines a through hole 56. A screw 58 is inserted into through hole 56 and a mounting bracket 60. Mounting bracket 60 is integral to dial indicator 40. The dial indicator is held in place with nut 62 threaded on screw 58. Further, a washer 64 is located between a head of the screw and body 32, between the body and mounting bracket 60, and between mounting bracket 60 and nut 62. Accordingly, the dial indicator is rotatable about screw 58 and can be locked in place by locking nut 62 against mounting bracket 60.

Leveling portion 44 consists of a generally concave opening 66 formed in distal end 42 and a leveling rod 68 secured within the generally concave opening with screws 70. Counterweight 68 preferably includes a pair of grooves 72 machined in the circumference and spaced apart approximately the same distance as screws 70. Specifically, screws 70 ride within grooves 72 and prevent counterweight 68 from moving side-to-side or from coming out of opening 66.

Cradle 46 includes a base 74 intermediate a pair of shoulders 76. In a preferred embodiment, both base 74 and shoulders 76 are cylindrical in shape and base 74 has a threaded opening on each end. Base 74 also has a length A slightly longer than the width of body 32 and centering device 48. Shoulders 76 are secured to body 74 with a bolt 78. Further, shoulders 76 extend radially outward of base 74 in order to prevent relative axial movement of body 32 and centering device 48 as will be discussed in greater detail below.

Centering device 48 is a pair of pins 80 in a preferred embodiment. Each pin has a length B approximately equal to the width of body 32 and slightly smaller than length A of base 74. Pins 80 are each generally cylindrical in shape and smaller than cradle 46. Further, each pin has a diameter C of approximately 0.25 inches in a preferred embodiment, although any suitable diameter may be used and is within the spirit and scope of the present invention as claimed.

Having described the structure of the preferred embodiment, a preferred method of operation will be described in detail and should be read in light of FIGS. 1 though 14 and particularly FIGS. 4 through 14.

Figure 4:
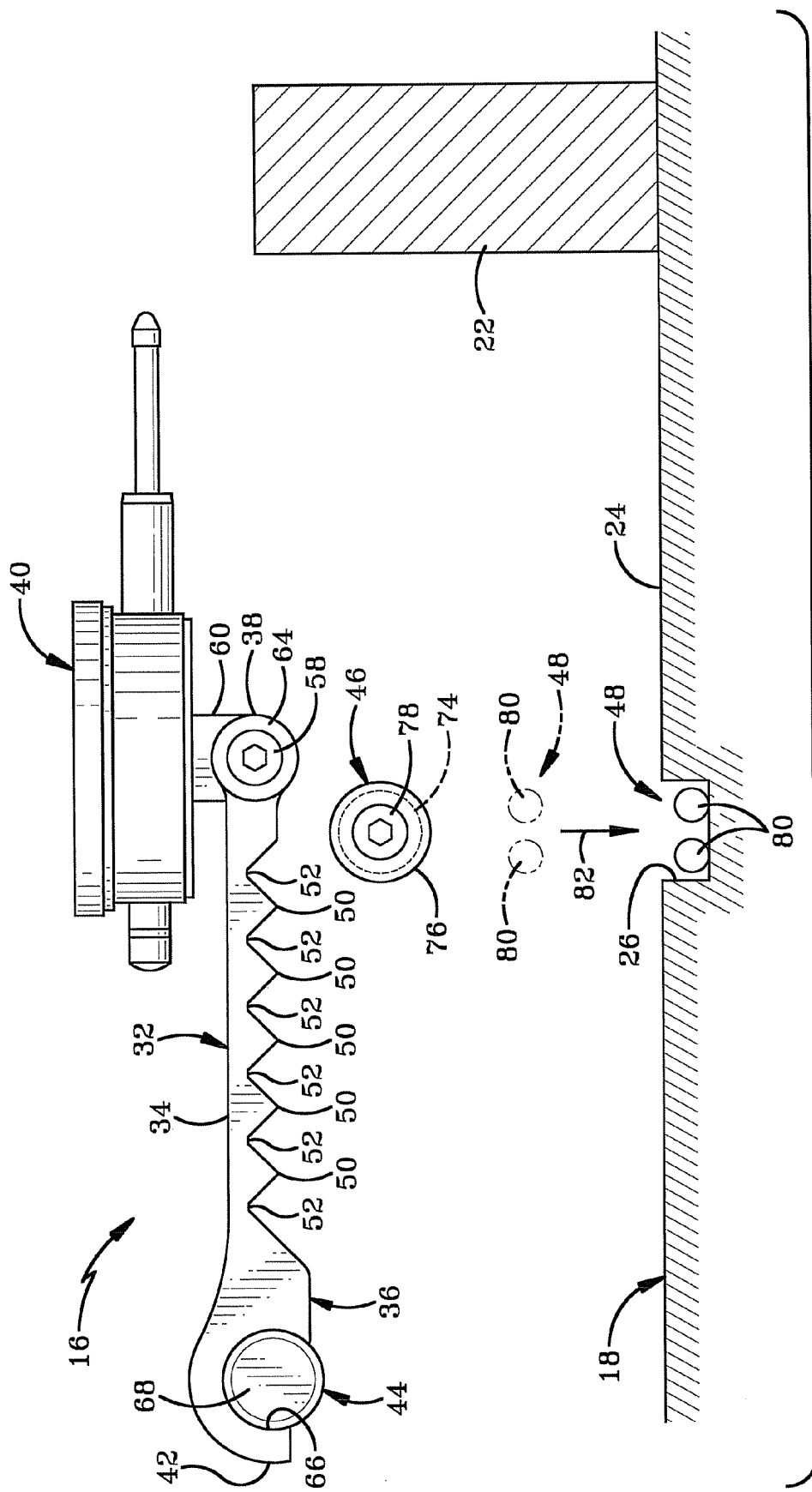
FIG. 4 is a right plan view of a preferred embodiment saw gauge being located on alignment pins within a miter gauge slot.

FIGS. 4 through 9 and particularly FIG. 4 illustrate the arrangement of the components and particularly how centering device 48, cradle 46, and body 32 are aligned in order to provide a measurement. Initially, centering device 48 is located within miter gauge slot 26. Next, cradle 46 is lowered in the direction associated with arrow 82 until the cradle is resting on the centering device.

In accordance with another main feature of the invention and seen in FIG. 5, when cradle 46 is located on pins 80 of centering device 48, pins 80 are each forced in opposite directions. Specifically, one pin is forced in the direction of arrow 84, while the other pin is forced in the opposite direction as indicated by arrow 86. In FIG. 6, pins 80 are seen located completely within shoulders 76 of cradle 46.

Figure 7:
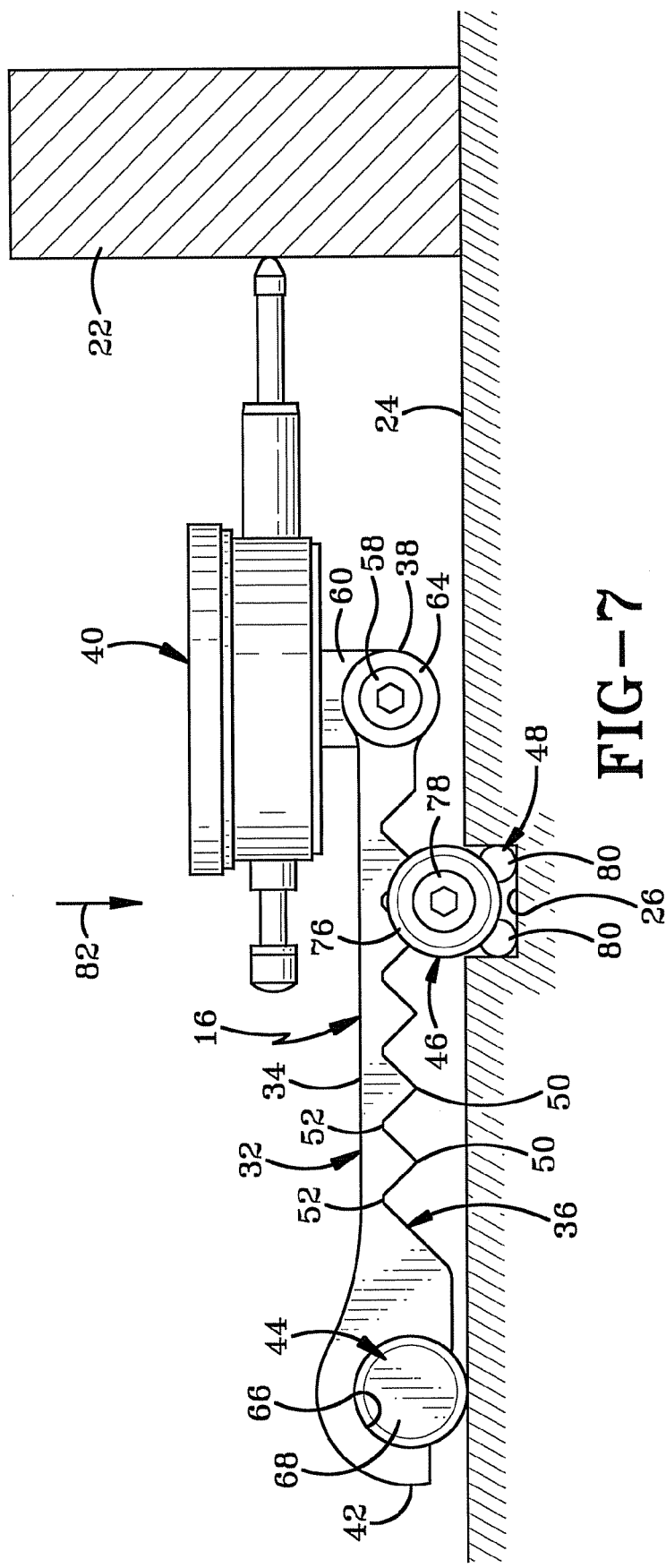
FIG. 7 is a right plan view of a preferred embodiment saw gauge located on alignment pins and a cradle and measuring alignment of a table fence.
Figure 9:
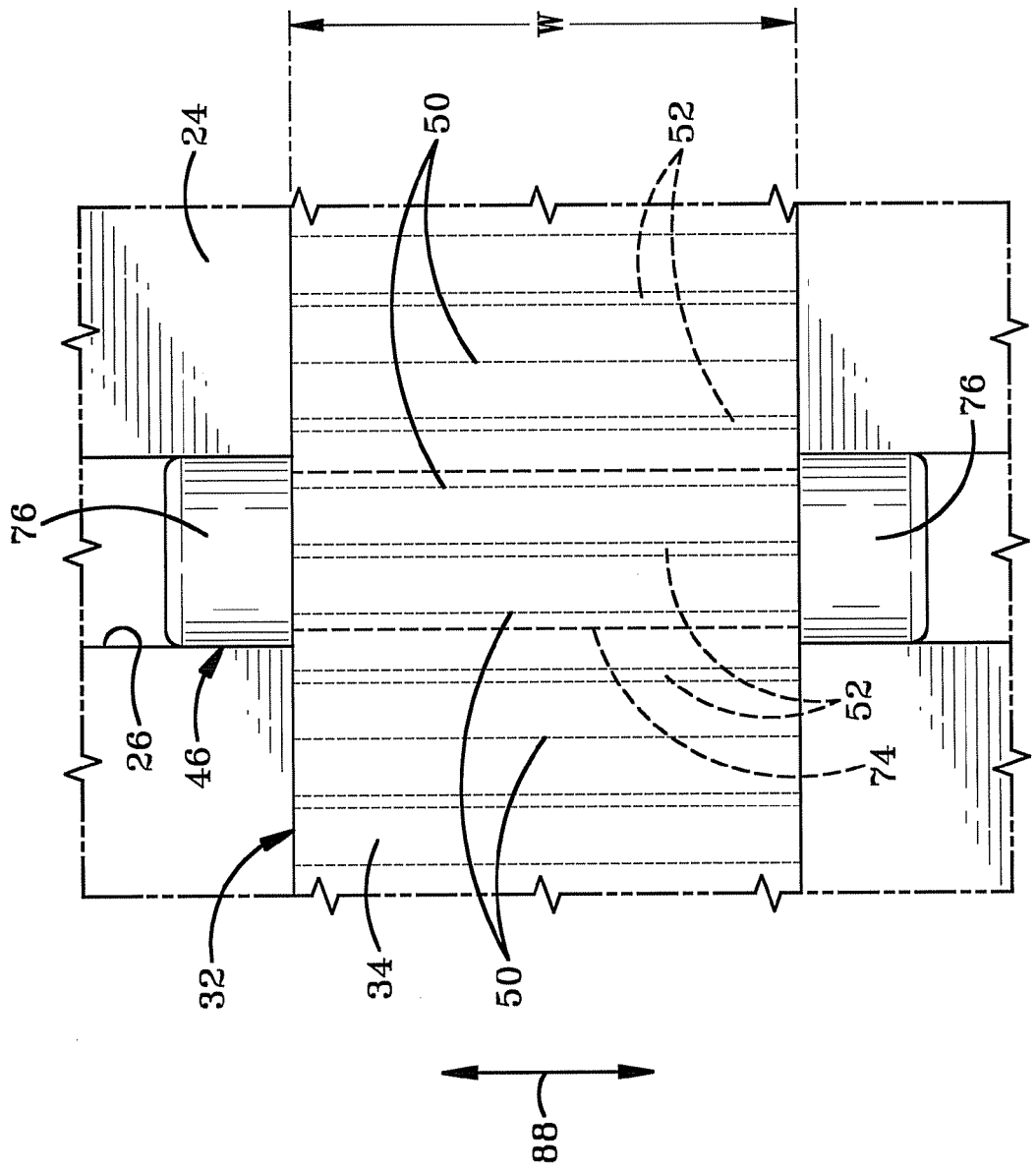
FIG. 9 is a top plan view of a portion of a preferred embodiment saw gauge located on alignment pins and a cradle with portions of the body shown in dashed lines.

Next, body 32 is located on cradle 46, as seen in FIGS. 7 and 8. Further, if pins 80 of centering device 48 were not separated completely when cradle 46 was placed on them, then the additional weight of body 32 will further propel pins 80 in opposite directions. Advantageously, the weight and arcuate shape of body 32, cradle 46, and centering device 48 force pins 80 to the outer edge of miter gauge slot 26 while cradle 46 remains continuously centered and tangentially engaged between the pins. Further, as illustrated in FIG. 9, body 32 preferably has a width W slightly smaller than a length A of the cradle. Advantageously, relative movement of body 32 in the directions associated with arrows 88 are restricted by shoulders 76. In accordance with yet another main feature of the invention body 32, cradle 46, and centering device 48 all move as a single unit in the directions associated with arrows 88.

Figure 10:
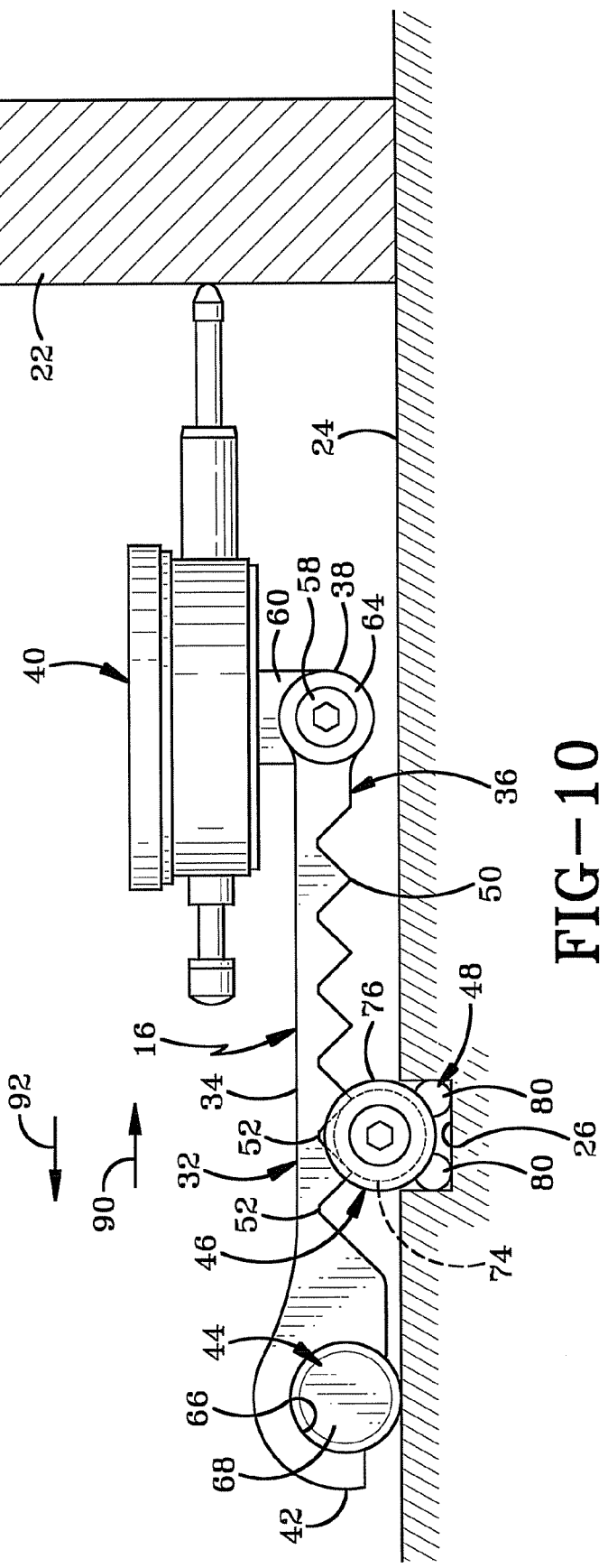
FIG. 10 is a right plan view of a preferred embodiment saw gauge being moved towards a table fence.

FIG. 10 illustrates measurement of parallelism of table fence 22, although the steps taken are equally applicable to measurement of a saw blade or any other item. One of the next steps is moving body 32 in the direction associated with arrow 90, or arrow 92 if necessary, until dial indicator 40 is in sufficient contact to provide a range of measurements. Specifically, dial indicator 40 must be sufficiently depressed so that it can provide measurement of distances in directions associated with both arrows 90 and 92. In addition, body 32 is moved until one of valleys 52 rests on base 74 of cradle 46.

Figure 11:
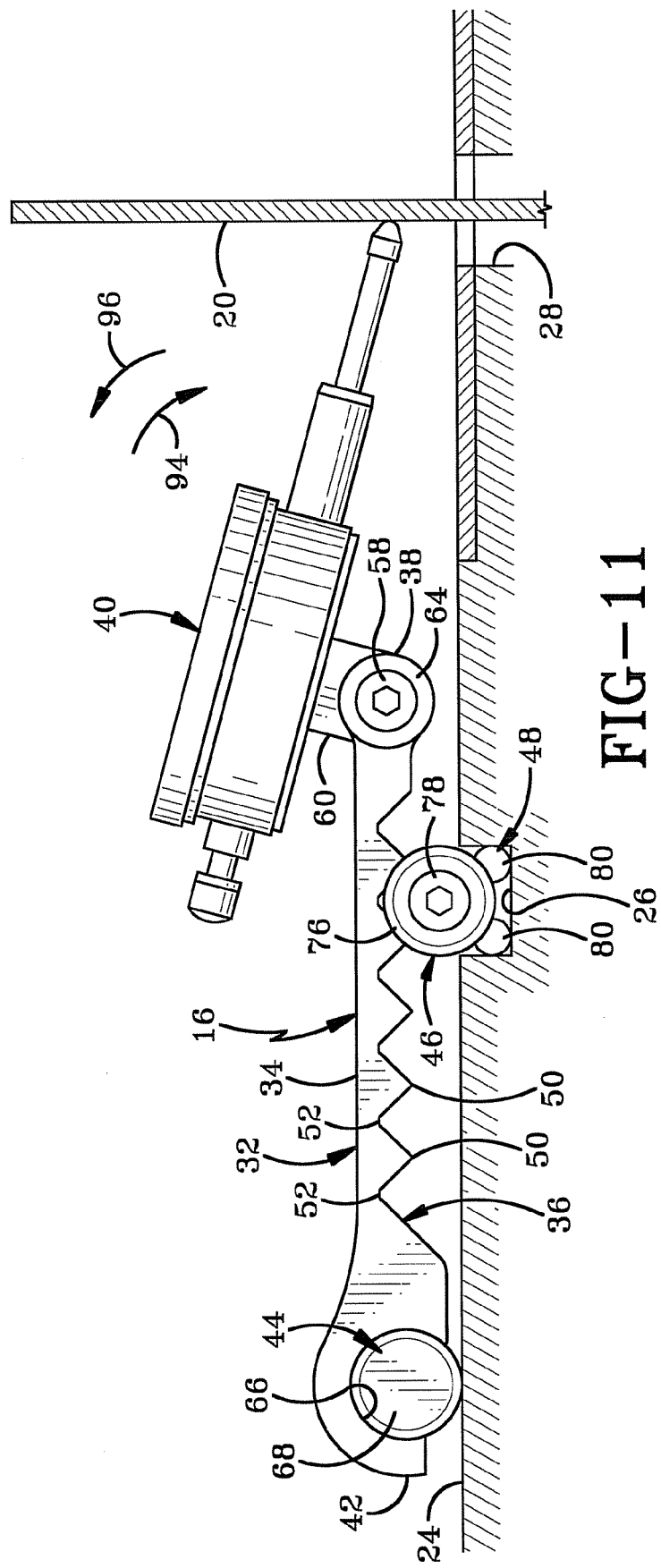
FIG. 11 is a right plan view of a preferred embodiment saw gauge being rotated downwards towards a lower portion of a table saw blade.

FIG. 11 illustrates measurement of parallelism of saw blade 20, although the steps taken are equally applicable to measurement of a table fence or any other item. The next step, if necessary, is rotating dial indicator 40 about screw 58 in the direction associated with arrow 94 or arrow 96 until a consistent measurement can be taken along the length of saw blade 20 or the item to be measured. This additional step may be necessary since body 32 may be at an angle due to counterweight 68 being in contact with work surface 24. Further, this step is used in the measurement of saw blade 20 to insure that the full length of the blade can be measured while avoiding contact with teeth of the saw blade. In particular, counterweight 68 preferably remains in contact with work surface 24 throughout the measuring process to maintain a consistent angle between the dial indicator and the item being measured.

Figure 12:
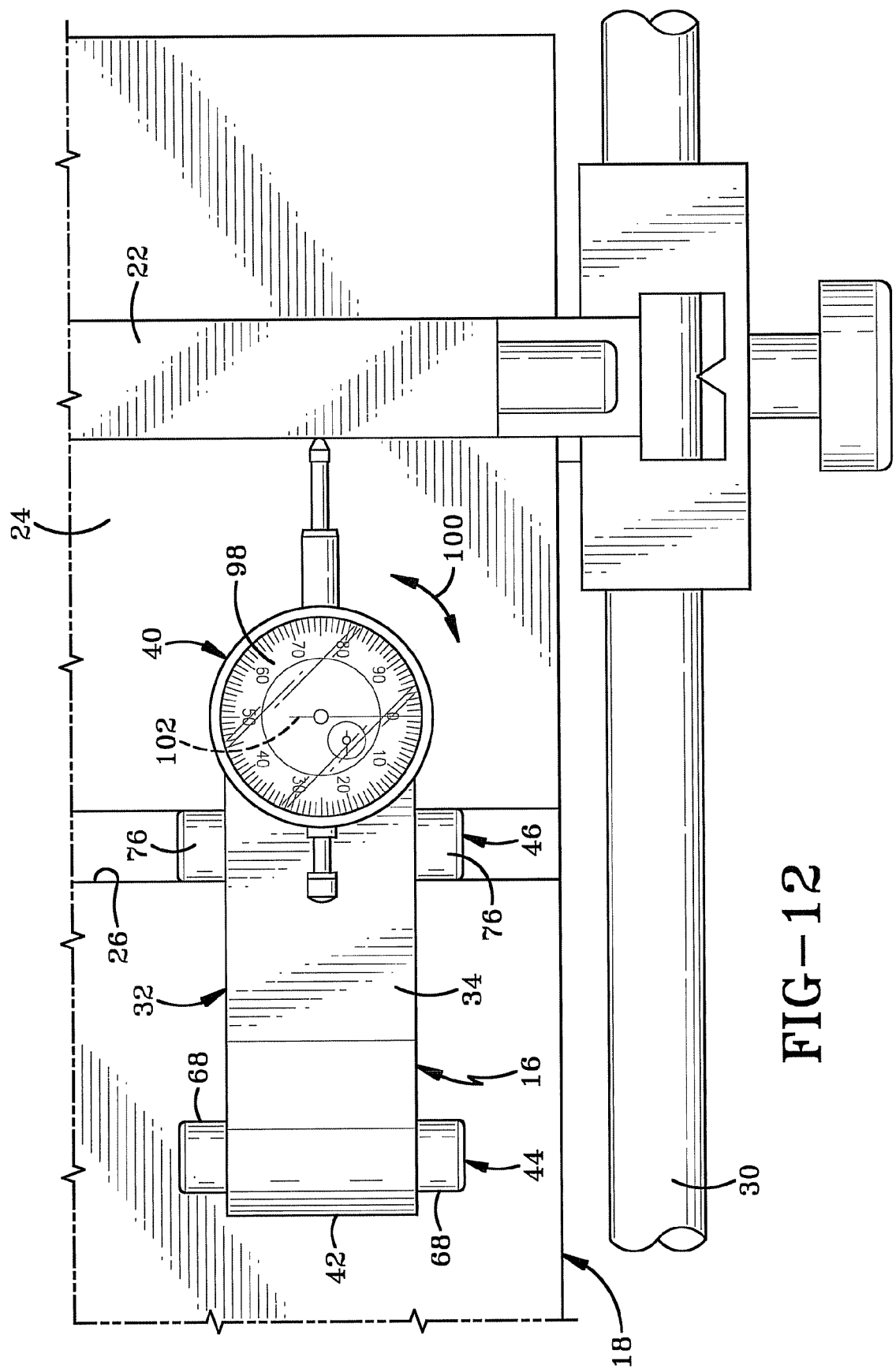
FIG. 12 is a top plan view of a preferred embodiment saw gauge dial indicator being rotated to provide a reference point.

FIG. 12 illustrates the next step of zeroing the dial indicator. In a preferred embodiment, the dial indicator includes a rotatable outer dial face 98 which can be rotated in either direction as indicated by arrows 100. The operator will rotate dial face 98 until an arm 102 is aligned with the "0" of the dial face. In an alternative embodiment, a digital indicator could be used, in which case the operator would merely depress the "zero" button. Either option allows the operator to "zero" the gauge or provide an initial reference point from which to measure the taper of the object being measured.

Figure 13:
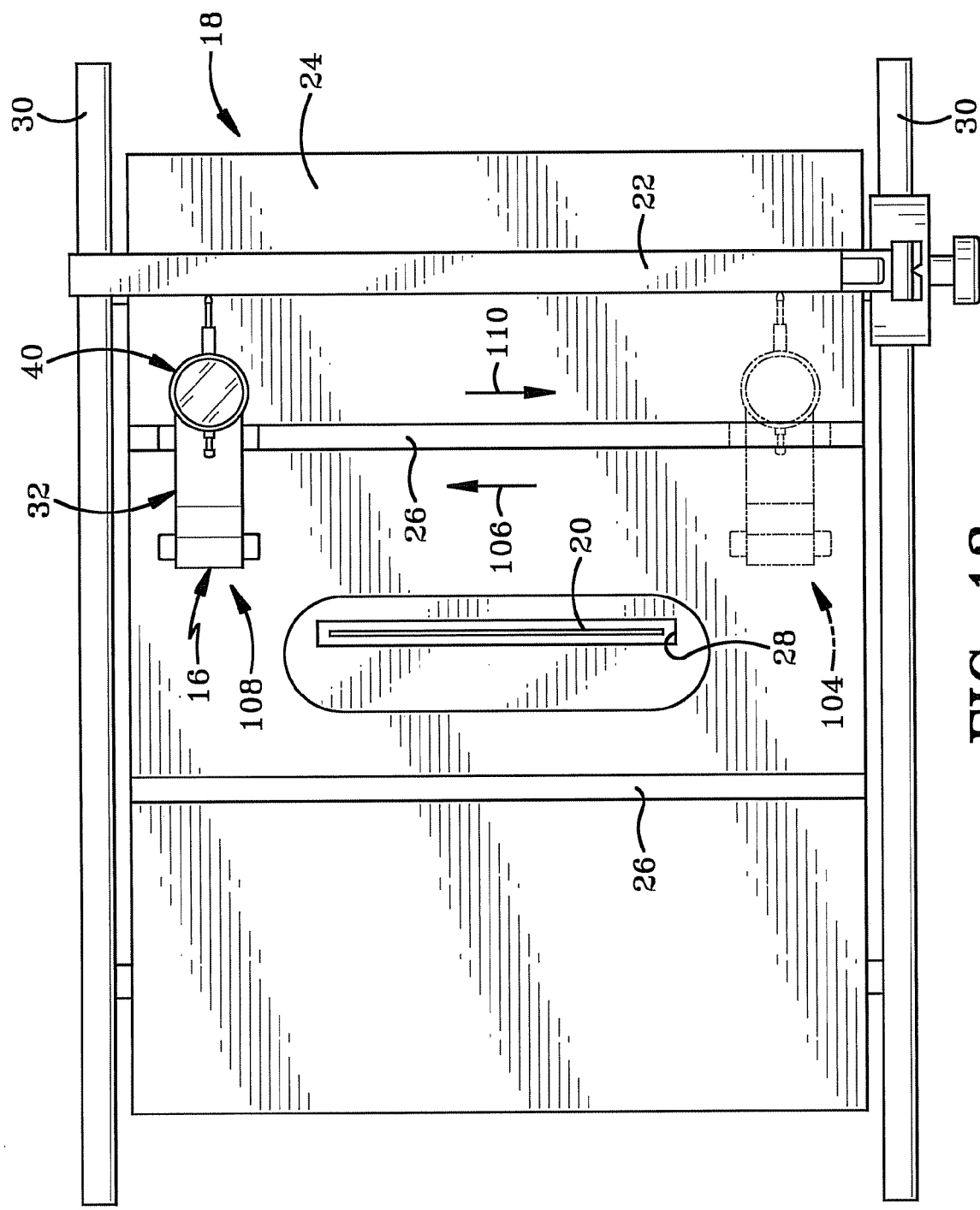
FIG. 13 is a top plan view of a preferred embodiment saw gauge being used to measure alignment of a table saw fence; and, FIG. 14 is a top plan view of a preferred embodiment saw gauge being used to measure alignment of a table saw blade.
Figure 14:
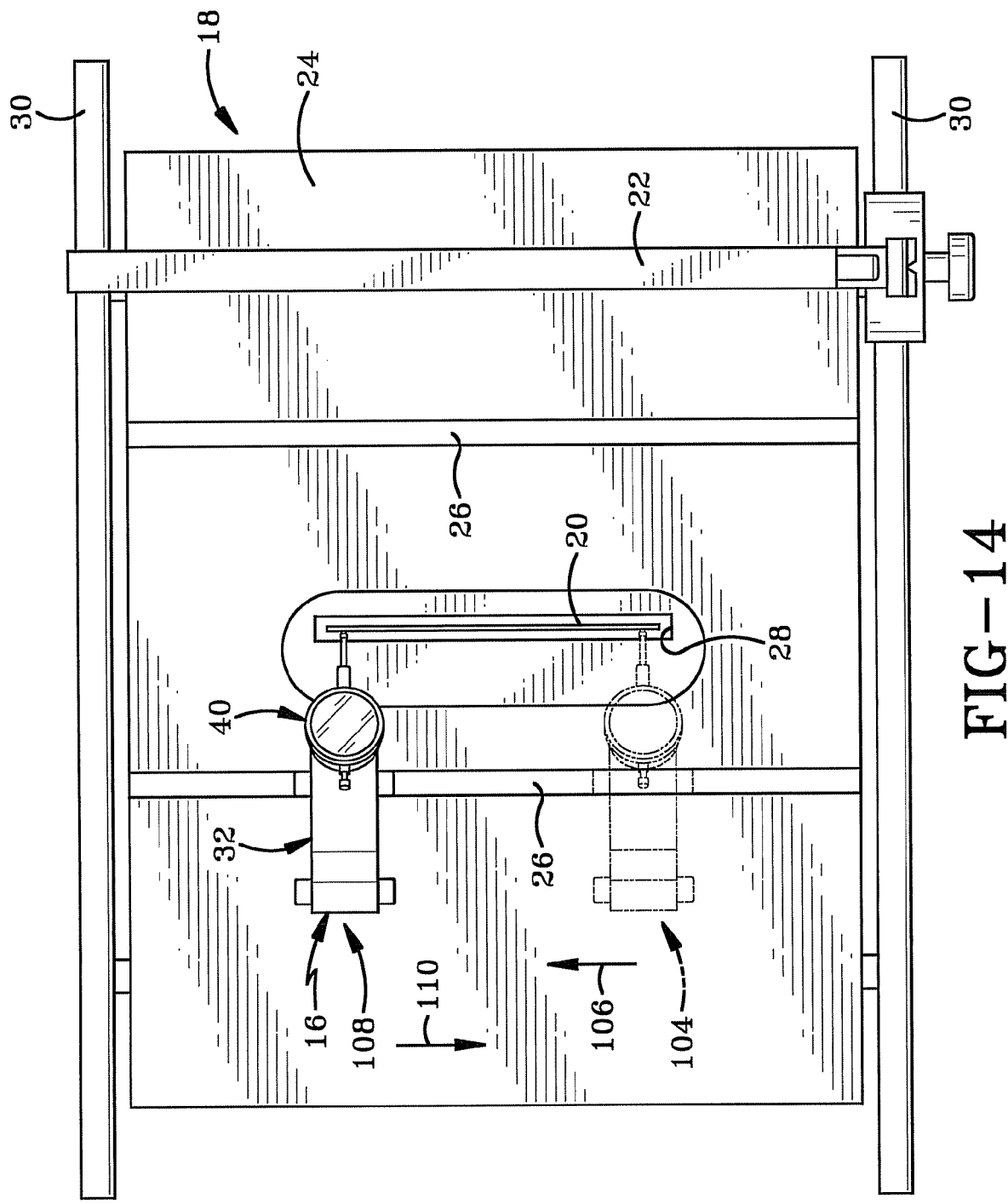

FIGS. 13 and 14 illustrate the measurement of table fence 22 and saw blade 20, respectively. In particular, saw gauge 16 is arranged in a first position 104 after the dial indicator is zeroed. The operator moves saw gauge 16 as a single unit in the direction associated with arrow 106 until a second position 108 is reached. Further, the operator may move the saw gauge in the direction associated with arrow 110 to verify the measurements. Although specific directions are indicated, the operator may move saw gauge 16 in either direction to obtain the item's parallelism without departing from the spirit and scope of the present invention as claimed.

During the movement in the direction of arrows 106 or 110, the operator must pay special attention to the dial indicator to determine if the table saw, fence, or other time is not properly aligned. If the item is not properly aligned, the operator will make any necessary adjustments and repeat the movement in the direction of arrows 106 or 110 until the item is properly aligned.

In summary, saw gauge 16 includes body 32 with valleys 52 for alignment with cradle 46 and centering device 48. The centering device and cradle ensure that body 32 is properly aligned during the measurement process and that a consistent measurement is achieved. The alignment method includes the steps of locating centering device 48 within miter gauge slot 26, locating cradle 46 on the centering device, locating body 32 on the cradle, zeroing dial indicator 40 to obtain a reference point, moving the centering device, cradle, and body together as a single unit along the miter gauge slot length to a second position, and obtaining any dial indicator measurements from the movement to a second position.

Accordingly, the saw gauge is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the saw gauge is constructed and used, the characteristics of the construction, and the advantageous new and useful results obtained; the new and useful structures, devices, elements, arrangement, parts, combinations, and methods are set forth in the appended claims.

What is claimed is:

1. A gauge for aligning a saw comprising:
    a body having a bottom surface;
    a centering device adapted to fit within a miter gauge slot having various sizes; wherein the centering device is a pair of pins aligned parallel to each other;
    a cradle supported on the centering device and located between the body and the centering device; wherein the body rests on the cradle during operation; and wherein the pins define a space having a width therebetween and wherein exertion of a downward force on the cradle moves the pair of pins away from each other thereby increasing the width of the space.

2. The gauge of claim 1 wherein locating the cradle on the centering device centers the cradle within the miter gauge slot.

3. The gauge of claim 1 wherein the body further comprises a measurement device extending beyond an end of the body.

4. The gauge of claim 3 wherein the measurement device is a dial indicator.

5. The gauge of claim 1 wherein the centering device is a pair of pins aligned parallel to each other.

6. A gauge for aligning a saw comprising:
    a body having a bottom surface;
    a centering device adapted to fit within a miter gauge slot having various sizes, wherein the centering device comprises at least one arcuate surface;
    a cradle supported on the centering device and located between the body and the centering device; wherein the body rests on the cradle during operation; and the cradle comprises at least one arcuate surface, and wherein the at least one arcuate surface of the centering device is tangentially engaged with the cradle at least one arcuate surface.

7. The gauge of claim 6 wherein the centering device is a pair of pins aligned parallel to each other.

8. The gauge of claim 7 wherein each of the pair of pins has a diameter of approximately 0.25 inches.

9. The gauge of claim 7 wherein each of the pair of pins is generally cylindrical in shape and smaller than the cradle.

10. A gauge for aligning a saw comprising:
    a body having a bottom surface;
    a centering device adapted to fit within a miter gauge slot having various sizes;
    a cradle supported on the centering device and located between the body and the centering device; and wherein the body rests on the cradle during operation; and wherein the cradle further comprises a shoulder located on each end, wherein the shoulders extend outward of the cradle body and the centering device is located between the shoulders.

11. The gauge of claim 10 wherein the centering device is a pair of pins aligned parallel to each other.

12. A The gauge of claim 1 for aligning a saw comprising:
    a body having a bottom surface;
    a centering device adapted to fit within a miter gauge slot having various sizes, and wherein the body further comprises a counterweight and the counterweight is a cylindrical rod having an outer surface engaged with a table surface at least partially defining an outer wall of the miter gauge slot;
    a cradle supported on the centering device and located between the body and the centering device; and wherein the body rests on the cradle during operation.

13. The gauge of claim 12 wherein the centering device is a pair of pins aligned parallel to each other.

14. A method of aligning a saw blade or a table fence comprising the steps of:
    locating a centering device within a miter gauge slot comprising the step of locating a pair of pins parallel to each other within the miter gauge slot;
    locating a cradle on the centering device;
    locating a body having a measurement portion on the cradle such that the cradle is between the centering device and the body;
    adjusting the measurement portion to achieve a reference point;

moving the centering device, the cradle, and the body along the miter gauge slot length to a second position;

obtaining a distance from the measurement portion as the body is moved along the miter gauge slot length;

displacing the pins in directions 180° from each other by providing a downward force on the cradle; and moving the body in a direction generally perpendicular to the length of the cradle to locate the cradle within a body valley.

15. The method of claim 14 further comprising the step of displacing the pins in directions 180° from each other until each pin contacts a side of the miter gauge slot.

16. The method of claim 14 further comprising the step of zeroing the measurement portion upon achieving the reference point and obtaining a parallelism measurement by moving the cradle and the body along the length of the miter gauge slot.

17. A method of aligning a saw blade or a table fence comprising the steps of:

locating a centering device within a miter gauge slot comprising the step of locating a pair of pins parallel to each other within the miter gauge slot;

locating a cradle on the centering device and centering the cradle upon the centering device;

locating a body having a measurement portion on the cradle such that the cradle is between the centering device and the body;

locating the centering device within a pair of shoulders of the cradle;

locating the body between the shoulders of the cradle;

adjusting the measurement portion to achieve a reference point;

moving the centering device, the cradle, and the body along the miter gauge slot length to a second position; and obtaining a distance from the measurement portion as the body is moved along the miter gauge slot length; and displacing the pins in directions 180° from each other by providing a downward force on the cradle.

18. The method of claim 17 further comprising the step of displacing the pins in directions 180° from each other until each pin contacts a side of the miter gauge slot.

19. A gauge for aligning a saw comprising:

a body having a bottom surface with a plurality of protrusions;

a centering device adapted to fit within a miter gauge slot having various sizes;

a cradle located on the centering device; and, wherein the body rests on the cradle during operation and the cradle is sized to extend intermediate adjacent protrusions.

20. The gauge of claim 19 wherein the protrusions are triangularly shaped and the cradle is cylindrically shaped.

* * * * *

UNITED STATES PATENT AND TRADEMARK OFFICE
CERTIFICATE OF CORRECTION

| | | |
|---|---|---|
| PATENT NO. | : 7,856,733 B2 | Page 1 of 1 |
| APPLICATION NO. | : 12/367808 | |
| DATED | : December 28, 2010 | |
| INVENTOR(S) | : Richard M. Hummel | |

It is certified that error appears in the above-identified patent and that said Letters Patent is hereby corrected as shown below:

Column 6, line 43 (Claim 12) "A The gauge of claim 1 for aligning" should be changed to
--A gauge for aligning--

Signed and Sealed this
Twenty-ninth Day of March, 2011

David J. Kappos
*Director of the United States Patent and Trademark Office*